(12) United States Patent
Minato et al.

(10) Patent No.: US 10,283,226 B2
(45) Date of Patent: May 7, 2019

(54) METHOD OF REPAIRING JET PUMP MEASURING PIPE AND REPAIR DEVICE THEREFOR

(71) Applicant: Kabushiki Kaisha Toshiba, Minato-ku (JP)

(72) Inventors: Yuki Minato, Shinagawa-ku (JP); Kunihiko Kinugasa, Yokohama (JP); Hajime Mori, Yokohama (JP); Satoshi Yamamoto, Kawaguchi (JP); Hiroyuki Adachi, Machida (JP); Tadahiro Mitsuhashi, Yokohama (JP); Masanobu Watanabe, Yokohama (JP); Yoshinori Katayama, Yokohama (JP); Kozue Matsukawa, Yokohama (JP); Satoshi Miyamura, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 1167 days.

(21) Appl. No.: 14/371,056

(22) PCT Filed: Jan. 23, 2013

(86) PCT No.: PCT/JP2013/000318
§ 371 (c)(1),
(2) Date: Jul. 8, 2014

(87) PCT Pub. No.: WO2013/111582
PCT Pub. Date: Aug. 1, 2013

(65) Prior Publication Data
US 2015/0016583 A1 Jan. 15, 2015

(30) Foreign Application Priority Data
Jan. 24, 2012 (JP) .................................. 2012-012099

(51) Int. Cl.
*G21C 19/20* (2006.01)
*G21C 15/25* (2006.01)
(Continued)

(52) U.S. Cl.
CPC ......... *G21C 19/207* (2013.01); *G21C 13/032* (2013.01); *G21C 15/25* (2013.01);
(Continued)

(58) Field of Classification Search
CPC .... G21C 19/207; G21C 15/25; G21C 13/032; G21C 17/032
See application file for complete search history.

(56) References Cited

U.S. PATENT DOCUMENTS

| | | | |
|---|---|---|---|
| 6,233,301 B1 * | 5/2001 | Robergeau | B23H 9/00 219/69.11 |
| 2008/0247498 A1 | 10/2008 | Nopwaskey et al. | |
| 2012/0032064 A1 * | 2/2012 | Defilippis | F16B 2/12 248/675 |

FOREIGN PATENT DOCUMENTS

| | | | |
|---|---|---|---|
| JP | 62-153796 | * | 7/1987 |
| JP | 62-180800 | * | 11/1987 |

(Continued)

OTHER PUBLICATIONS

Office Action dated Apr. 28, 2015 in Japanese Patent Application No. 2012-012099.
(Continued)

*Primary Examiner* — Lily C Garner
(74) *Attorney, Agent, or Firm* — Oblon, McClelland, Maier & Neustadt, L.L.P.

(57) ABSTRACT

A jet pump measuring pipe repair method that repairs a ruptured part of a measuring pipe horizontally installed to a lower portion of a jet pump provided in reactor water inside a reactor pressure vessel. The repair method includes: fixing (Continued)

a support member to the jet pump near the measuring pipe left remained; mounting, after the support member fixing, a measuring pipe connector provided with a pipe-repairing pipe having both ends over which connecting pipes are fitted, respectively, to the support member; connecting, after the connector mounting, the remaining measuring pipe and connecting pipe using the measuring pipe connector.

4 Claims, 20 Drawing Sheets

(51) Int. Cl.
*G21C 17/032* (2006.01)
*G21C 13/032* (2006.01)
*G21C 19/19* (2006.01)
(52) U.S. Cl.
CPC ........... *G21C 17/032* (2013.01); *G21C 19/19* (2013.01); *Y02E 30/40* (2013.01); *Y10T 29/49238* (2015.01)

(56) References Cited

FOREIGN PATENT DOCUMENTS

| JP | 62 180800 | 11/1987 |
|----|-----------|---------|
| JP | 63-307213 A | 12/1988 |
| JP | 11 267838 | 10/1999 |
| JP | 2004 209515 | 7/2004 |
| JP | 2008 256586 | 10/2008 |
| JP | 2008 261854 | 10/2008 |
| JP | 4298527 | 7/2009 |
| JP | 2012 122970 | 6/2012 |

OTHER PUBLICATIONS

International Search Report dated Apr. 16, 2013 in PCT/JP13/000318 Filed Jan. 23, 2013.

\* cited by examiner (a)

(b)

METHOD OF REPAIRING JET PUMP MEASURING PIPE AND REPAIR DEVICE THEREFOR

TECHNICAL FIELD

An embodiment of the present invention relates to a jet pump measuring pipe repair method for repairing a measuring pipe mounted to a diffuser of a jet pump in a boiling water reactor and a repair device therefor.

BACKGROUND ART

Conventionally, in a boiling water reactor, a so-called jet pump system obtained by combining a recirculation pump installed outside a reactor pressure vessel and a jet pump installed inside the reactor pressure vessel is for the purpose of increasing an output power density.

As illustrated in FIG. 22, a plurality of jet pumps 4 are circumferentially arranged at equal intervals in a downcomer portion 3 between a reactor pressure vessel 1 and a shroud 2 each having an axis extending in a vertical direction. As illustrated in FIG. 23 which illustrates a main part of FIG. 22 in an enlarged manner, the jet pump 4 has a riser pipe 5. The riser pipe 5 is fixed to the reactor pressure vessel 1 and introduces coolant supplied from a recirculation inlet nozzle 6 of a recirculation pump into the reactor.

A pair of elbows 7A and 7B are connected to an upper portion of the riser pipe 5 through a transition piece 14. The pair of elbows 7A and 7B are connected with a pair of inlet throats 9A and 9B, respectively, through a pair of mixing nozzles 8A and 8B, respectively. The pair of inlet throats 9A and 9B are connected with diffusers 10A and 10B, respectively.

Hereinafter, the pair of inlet throats 9A and 9B and the pair of diffusers 10A and 10B are sometimes interchangeably or collectively referred to as inlet throat 9 and diffuser 10, respectively.

It is important to measure a flow rate of the jet pump 4 in a normal operation state in order to perform output power control of a nuclear power plant. Thus, a measuring pipe 11 is provided so as to extend from upper to lower portions of the diffusers 10A and 10B, respectively. Using the measuring pipe 11 to measure a difference in static pressure between the upper and lower portions of the diffuser 10, and a measurement value is calibrated by a calibration value obtained before use of a plant, whereby the flow rate of the jet pump 4 is calculated.

The measuring pipe 11 is welded to static pressure holes of the upper and lower portions of the diffuser 10 and welded to/supported by support members, such as a block 12 and a support 13 (FIG. 24), fixed to the diffuser 10. Further, as illustrated in FIGS. 25A and 25B, the measuring pipe 11 is disposed in a complicated manner at the lower portions of the jet pumps 4 and is connected to piping outside the reactor through a jet pump measuring nozzle 15. The jet pump measuring nozzle 15 is provided at two symmetrical positions in a horizontal cross-section of the reactor pressure vessel 1.

The jet pump 4 having the above configuration is used under severe conditions than those for other devices due to high temperature of about 300 degrees centigrade and flow of high speed and large flow coolant water fed by means of a not illustrated recirculation pump. Thus, a large load is applied to each member and, particularly, the measuring pipe 11 subjects to fluid vibration caused by the flow of high speed and large flow coolant water fed by means of the recirculation pump of the diffuser 10 directly or through the block 12 or the support 13, with the result that severe stress is applied to the measuring pipe 11. This may cause a rupture in the measuring pipe 11. If the measuring pipe 11 is ruptured, a flow rate of the jet pump 4 cannot be measured, affecting output power control of the reactor. Thus, repair work is urgently required.

As illustrated in FIG. 25B, the measuring pipe 11 is disposed in a narrow annular space 16 between the reactor pressure vessel 1 and the shroud 2, and the riser pipe 5, the inlet throat 9, and the like are disposed above the measuring pipe 11, as illustrated in FIG. 23. A horizontal part of the measuring pipe 11 near the support 13 illustrated in FIG. 24 is positioned closest to the shroud 2, and an interval between the horizontal part and the shroud 2 is less than 150 mm.

Further, an upper portion of the horizontal part of the measuring pipe 11 is overhung with an intermediate body of the shroud 2. This limits a shape and a size of a repair device to the measuring pipe 11 and a repair method, making the repair work very difficult.

Further, a site around which the measuring pipe 11 is installed is a high-radiation area, making it very difficult for a worker to get close to the piping section. Thus, under present circumstances, there is no way other than to perform the repair work of the measuring pipe 11 underwater in a remote-controlled manner from just above a core.

As a repair method for such a measuring pipe 11, there are methods using a welding device conducting welding after discharge of reactor water and an underwater laser welding device (refer to, e.g., Patent Documents 1 and 2).

PRIOR ART DOCUMENTS

Patent Documents

Patent Document 1: Japanese Patent No. 4,298,527
Patent Document 2: Japanese Patent Application Laid-Open Publication No. 2004-209515

SUMMARY OF THE INVENTION

Problems to be Solved by the Invention

The rupture of the above-described measuring pipe 11 often occurs at a welding part between the measuring pipe 11 and the block 12, and, accordingly, there have only been proposed repair methods targeting the measuring pipe 11 installed in the vertical direction of the jet pump 4.

Further, as illustrated in FIGS. 23 and 24, the installation position of the horizontal part of the measuring pipe 11 is very narrow, so that the technologies of Patent Documents 1 and 2 have difficulty in repairing the horizontal part.

For the reason that it is difficult to repair the horizontal part of the measuring pipe 11 for positional reasons, and for the purpose of reducing a repair time, remote-controlled underwater repair work is essential. Therefore, it is demanded to establish an underwater remote-controlled repair method in order to cope with the rupture of the horizontal part of the measuring pipe 11.

An object of embodiments of the of the present invention is to provide a jet pump measuring pipe repair method and a repair device therefor, capable of coping with the rupture occurring in a lower portion of the underwater jet pump to which the measuring pipe is horizontally installed and capable of facilitating repair work at a narrow portion.

Means for Solving the Problem

In order to achieve the above-mentioned object, according to an embodiment, there is provided a jet pump measuring pipe repair method that repairs a ruptured part of a measuring pipe horizontally installed to a lower portion of a jet pump provided in reactor water inside a reactor pressure vessel, the method comprising: a support member fixing step of fixing a support member to the jet pump near the measuring pipe left remained; a connector mounting step of mounting, after the support member fixing step, a measuring pipe connector provided with a pipe-repairing pipe having both ends over which connecting pipes are fitted, to the support member; a connecting step of connecting, after the connector mounting step, the remaining measuring pipe and the connecting pipes using the measuring pipe connector.

Furthermore in order to achieve the above-mentioned object, according to an embodiment, there is provided a repair device for jet pump measuring pipe that repairs a ruptured part of a measuring pipe horizontally installed to a lower portion of a jet pump provided in reactor water inside a reactor pressure vessel, the device comprising: a support member that fixed to the jet pump near the measuring pipe left remained; and a measuring pipe connector provided with a pipe-repairing pipe having both ends over which connecting pipes are fitted, respectively and fixed to the support member, the measuring pipe connector being used to connect the remaining measuring pipe and connecting pipe.

Advantage of the Invention

The embodiment of the present invention can cope with the rupture occurring in a lower portion of the underwater jet pump to which the measuring pipe is horizontally installed and can facilitate repair work at a narrow portion.

EMBODIMENTS FOR CARRYING OUT THE INVENTION

Figure 1:
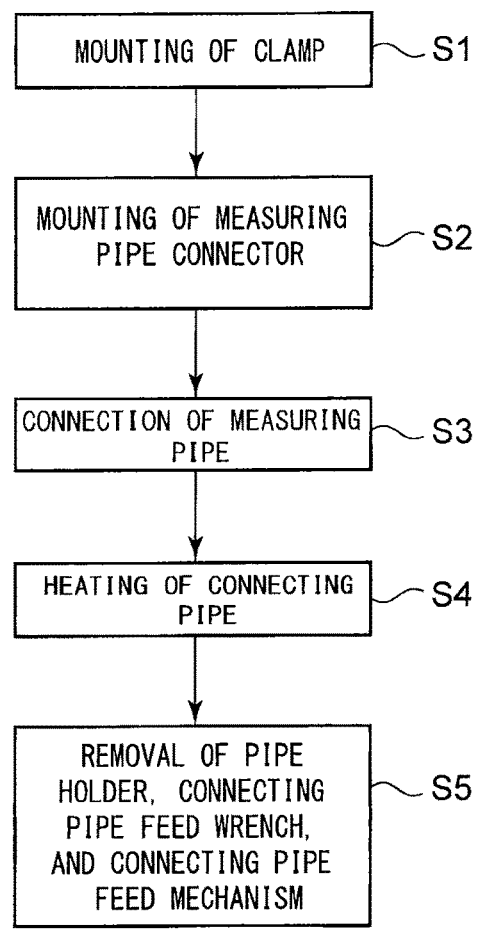
FIG. 1 is a flowchart illustrating an embodiment of a jet pump measuring pipe repair method according to the present invention.

An embodiment of a jet pump measuring pipe repair method according to the present invention will be described below with reference to the drawings.

Hereinafter, the same reference numerals are given to the same parts as those in FIGS. 22 to 25. Further, the present embodiment will describe a case where repair is made to a ruptured part of a measuring pipe 11 which is horizontally installed to a diffuser 10 of a jet pump 4 provided in reactor water in a reactor pressure vessel 1 having an axis extending in a vertical direction. The repair work is conducted in a state where an upper portion of the reactor pressure vessel 1 is opened at reactor shutdown time, and reactor water is retained in an inside and an upper portion of the reactor pressure vessel 1.

FIG. 1 is a flowchart illustrating the embodiment of the jet pump measuring pipe repair method according to the present invention. This flowchart is a repair flowchart to be applied to a case where the horizontal part of the measuring pipe 11 is ruptured.

As illustrated in FIG. 1, the repair method according to the present embodiment roughly includes: step S1 of mounting a C-shaped clamp 17 as a support member; step S2 of mounting a measuring pipe connecting unit 30 as a measuring pipe connector; step S3 of connecting the measuring pipe 11; step S4 of heating a connecting pipe 24; and step S5 of removing a pipe holder 32, a connecting pipe feed wrench 34, and a connecting pipe feed mechanism 33 from the measuring pipe connecting unit 30 for removal.

First, the C-shaped clamp 17 used in step S1 will be described.

Figure 2:
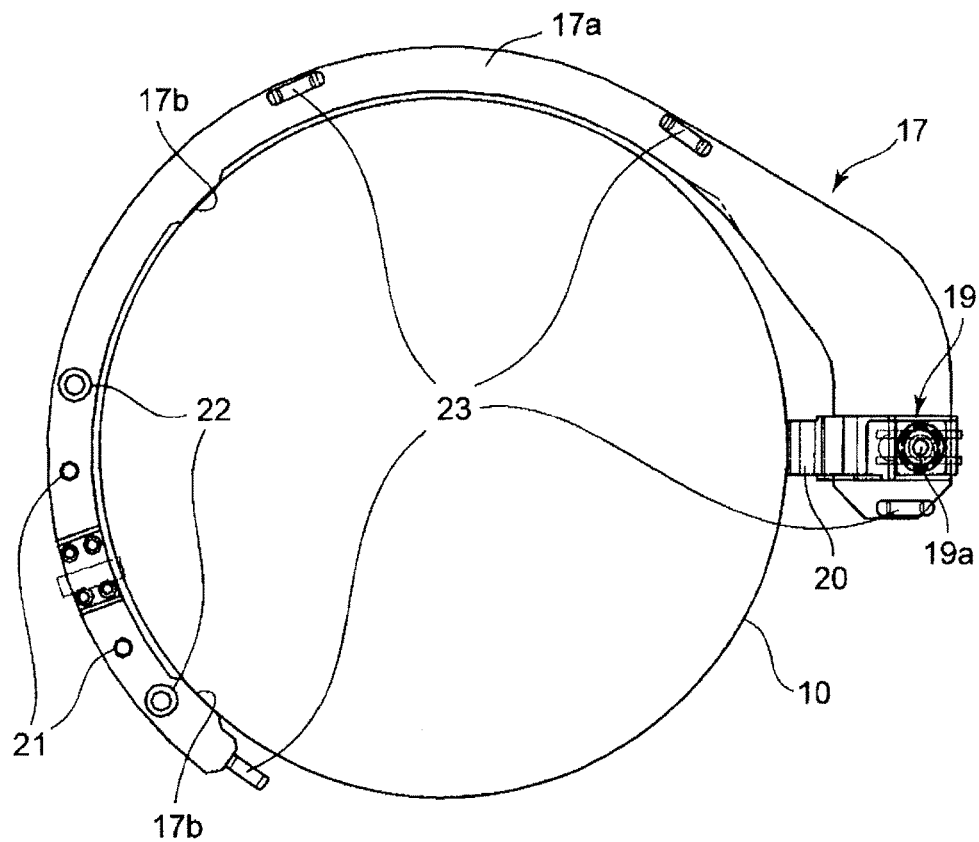
FIG. 2 is a plan view illustrating a C-shaped clamp used in the embodiment illustrated in FIG. 1.
Figure 3:
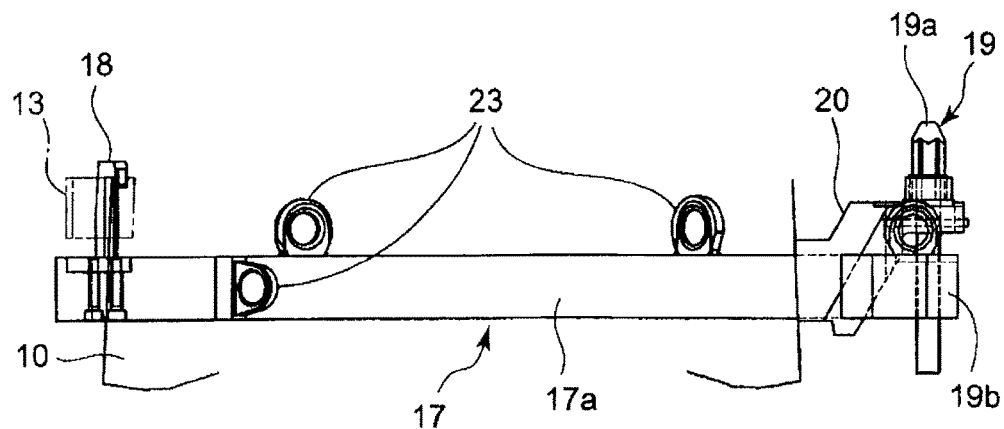
FIG. 3 is an elevation view of FIG. 2.

FIG. 2 is a plan view illustrating the C-shaped clamp used in the embodiment illustrated in FIG. 1. FIG. 3 is an elevation view of FIG. 2.

As illustrated in FIGS. 2 and 3, the C-shaped clamp 17 has a clamp body 17a, a positioning hook 18, a clamp fixing mechanism 19, two fixing screw holes 21, two positioning holes 22, and four hanging lugs 23 used for hanging the clamp body 17a by a not illustrated hanging member.

As illustrated in FIG. 2, the two fixing screw holes 21 are disposed at both sides of the positioning hook 18, and a fixing bolt of a measuring pipe support bracket to be described later is screwed into each of the fixing screw holes 21. The two positioning holes 22 are disposed outside the fixing screw holes 21, respectively, and a positioning pin of the measuring pipe support bracket to be described later is inserted into each of the two positioning holes 22.

The clamp body 17a is formed into a C-shape in a plan view and mounted to the diffuser 10 so as to surround an outer periphery thereof. Further, the clamp body 17a has two protrusions 17b protruding from an inner peripheral surface thereof. The positioning hook 18 is fixed to an upper surface of the clamp body 17a, and is hooked to a remaining part of a previously cut support 13. In this state, a position in a height direction and a peripheral direction is adjusted to position the clamp body 17a.

The clamp fixing mechanism 19 is mounted at an end portion of the clamp body 17a and fixes the clamp body 17a to the diffuser 10. Specifically, the clamp fixing mechanism 19 has a slider 20 having a slope at an outer peripheral side thereof, a fixing bolt 19a which is rotated in a fastening direction or a loosening direction to move upward and downward the slider 20, and a wedge block 19b having, at an inner peripheral side thereof, a slope contacting the slope of the slider 20.

Thus, fastening the fixing bolt 19a by a not illustrated wrench moves downward the slider 20. Then, the slider 20 is moved downward along the slope of the wedge block 19b and in an inner peripheral direction of the clamp body 17a.

This causes an inner peripheral surface of the slider 20 to press an outer peripheral surface of the diffuser 10, and the two protrusions 17b of the clamp body 17a press the outer peripheral surface of the diffuser 10 by reaction force of this pressing force. As a result, the C-shaped clamp 17 is fixed to the outer peripheral surface of the diffuser 10.

The following describes detailed operation of step S1 of mounting a C-shaped clamp 17.

First, the C-shaped clamp 17 is hung at four hanging lugs 23 by a not illustrated hanging member and hung and held along an outer periphery of the shroud 2 with the clamp body 17a in a vertical direction. Then, the clamp body 17a is brought to a horizontal state at an upper portion of the diffuser 10 having a smaller diameter to loosely fit the clamp body 17a to the outer peripheral surface of the diffuser 10 and is then gradually lowered while maintaining the horizontal state of the clamp body 17a. Then, the positioning hook 18 fixed to the upper surface of the clamp body 17a is hooked to the support 13. In this state, a position in a height direction and a peripheral direction is adjusted to position the clamp body 17a. After that, the fixing bolt 19a of the clamp fixing mechanism 19 is fastened with a torque of 15 N·m to 20 N·m using a not illustrated wrench. As a result, the slider 20 is moved downward and in the inner peripheral direction of the clamp body 17a.

This causes the inner peripheral surface of the slider 20 to press the outer peripheral surface of the diffuser 10, and the two protrusions 17b of the clamp body 17a press the outer peripheral surface of the diffuser 10 by reaction force of this pressing force. As a result, the C-shaped clamp 17 is fixed to the outer peripheral surface of the diffuser 10.

The following describes step S2 of mounting the measuring pipe connecting unit 30. First, a configuration of the measuring pipe connecting unit 30 used in step S2 will be described.

Figure 4:
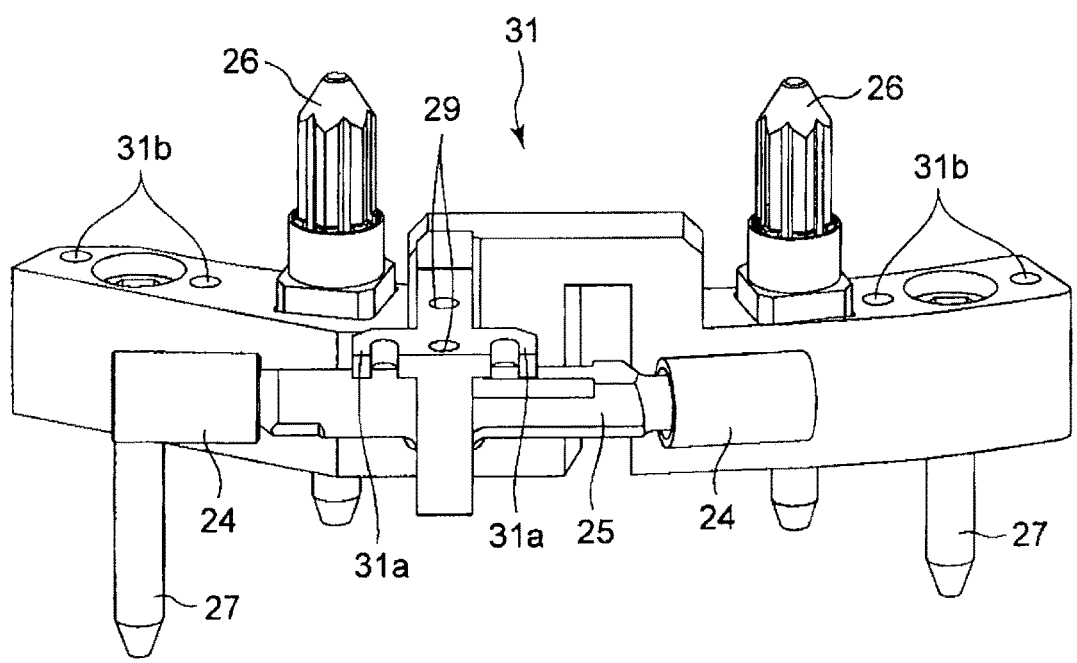
FIG. 4 is a perspective view illustrating a measuring pipe support bracket used in the embodiment illustrated in FIG. 1.
Figure 5:
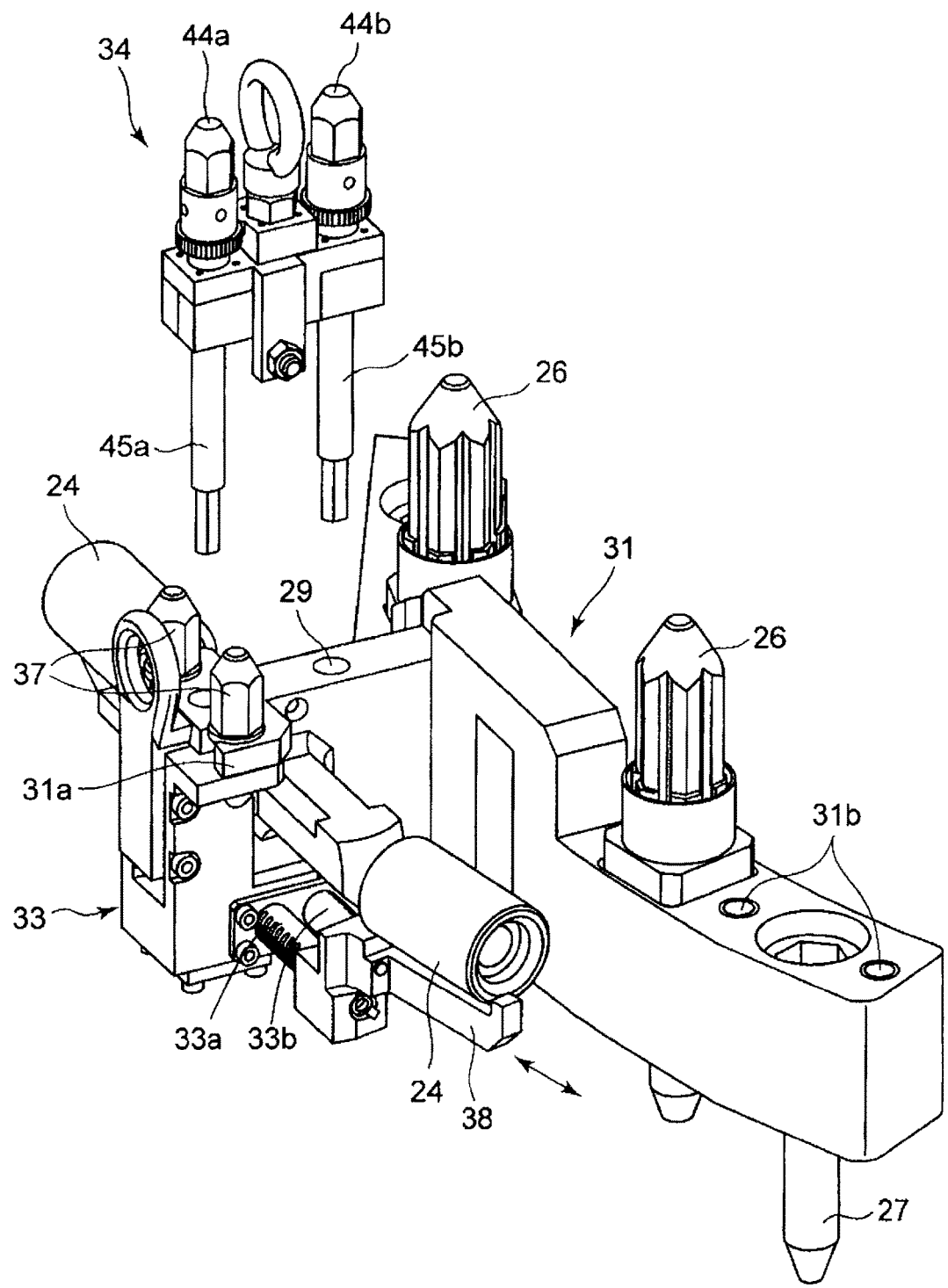
FIG. 5 is an exploded perspective view illustrating a state where a connecting pipe feed mechanism and a connecting pipe feed wrench are mounted to the measuring pipe support bracket of FIG. 4.
Figure 6:
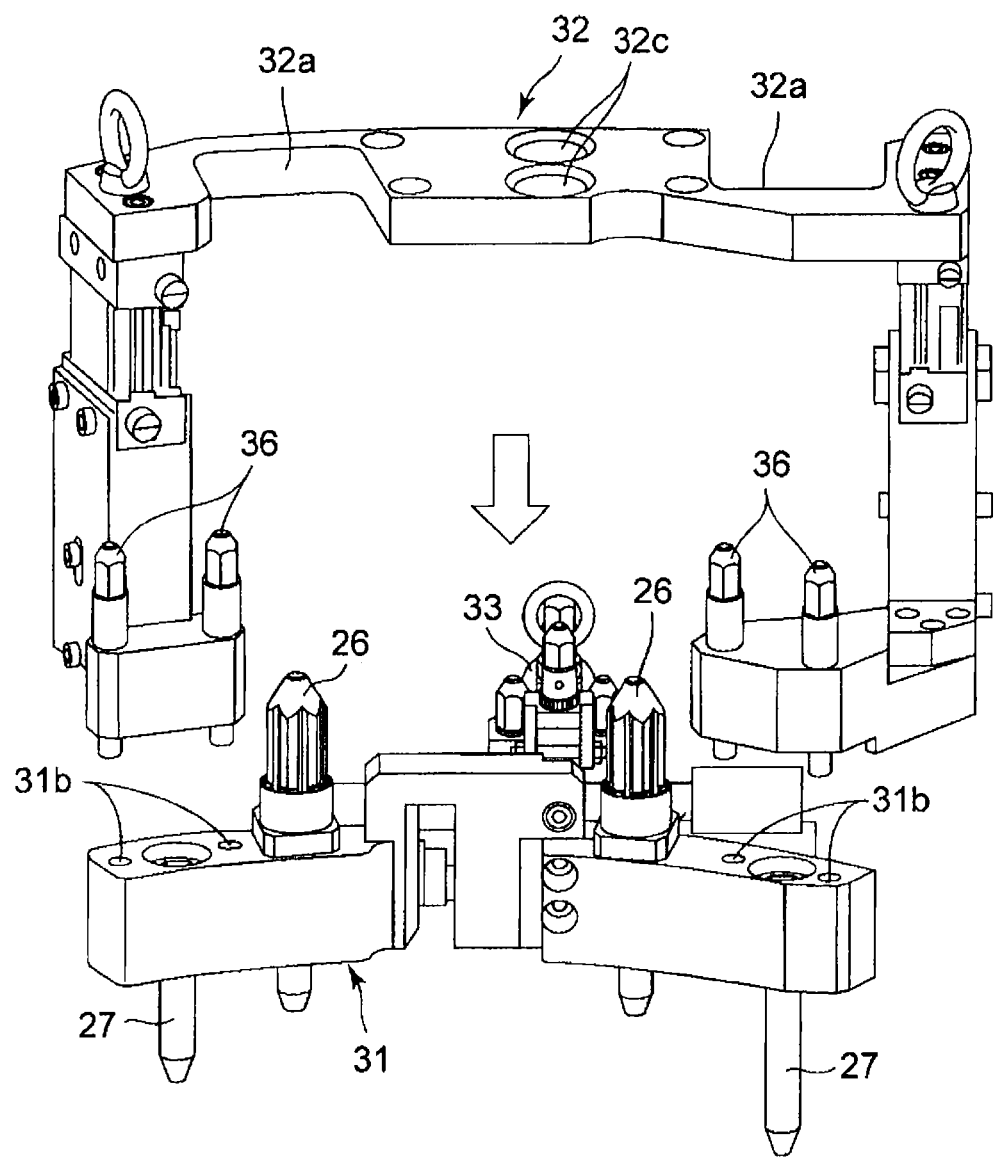
FIG. 6 is an exploded perspective view illustrating a state before mounting of a pipe holder to the measuring pipe support bracket of FIG. 5.
Figure 7:
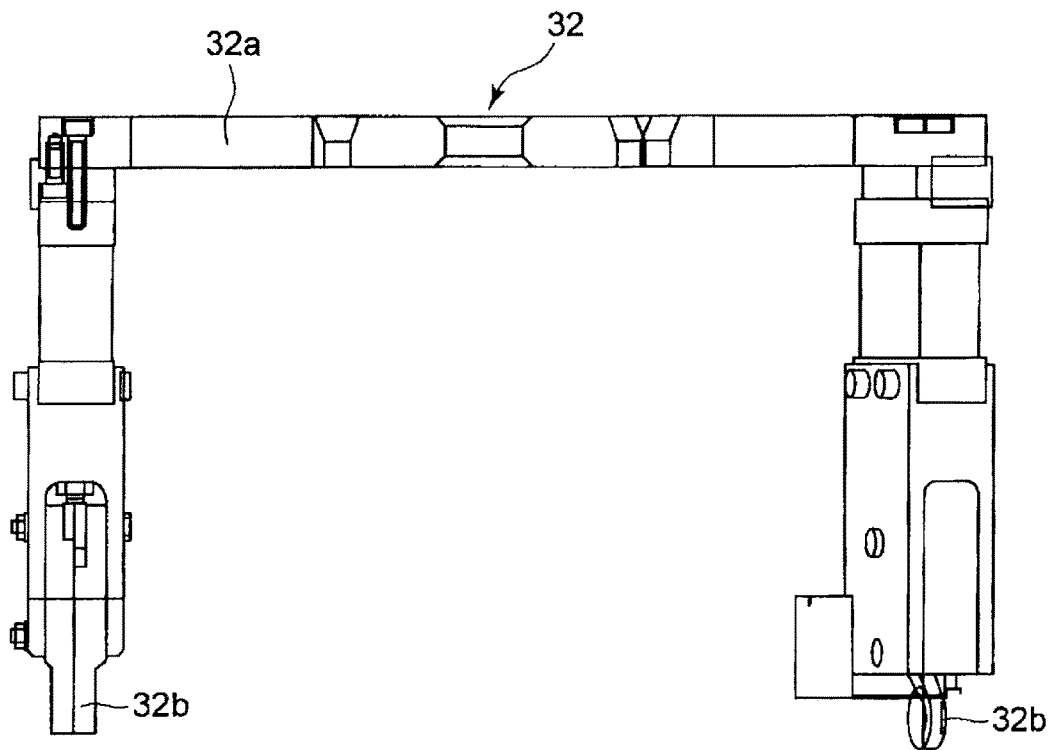
FIG. 7 is an elevation view illustrating the pipe holder of FIG. 6.
Figure 8:
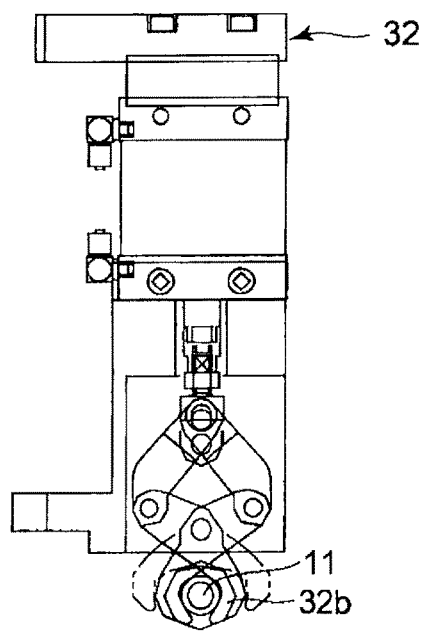
FIG. 8 is a side view illustrating the pipe holder of FIG. 6.
Figure 9:
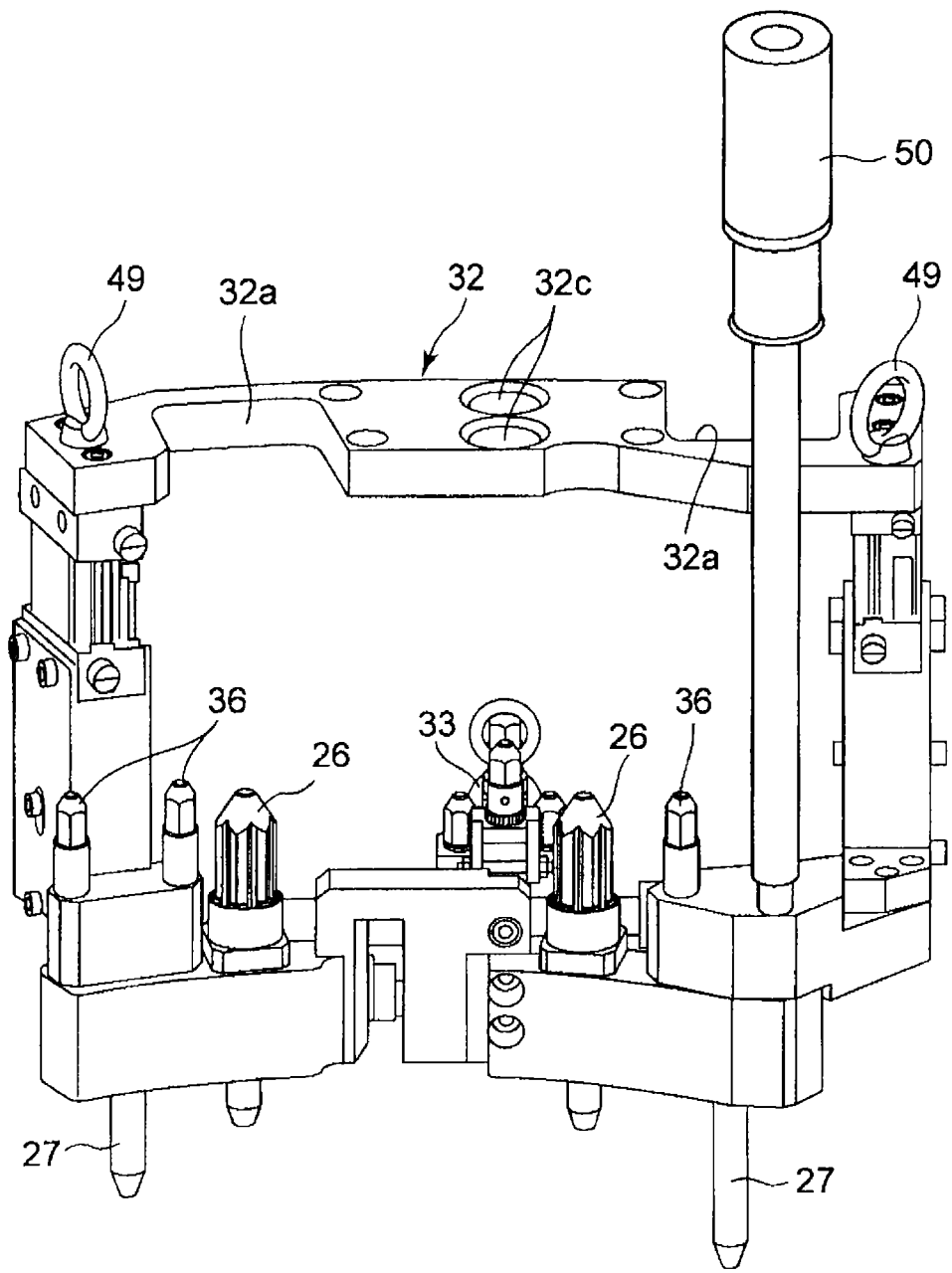
FIG. 9 is a perspective view illustrating a state where the piper holder is mounted to the measuring pipe support bracket of FIG. 5.

FIG. 4 is a perspective view illustrating a measuring pipe support bracket used in the embodiment illustrated in FIG. 1. FIG. 5 is an exploded perspective view illustrating a state where a connecting pipe feed mechanism and a connecting pipe feed wrench are mounted to the measuring pipe support bracket of FIG. 4. FIG. 6 is an exploded perspective view illustrating a state before mounting of a pipe holder to the measuring pipe support bracket of FIG. 5. FIG. 7 is an elevation illustrating the pipe holder of FIG. 6. FIG. 8 is a side view illustrating the pipe holder of FIG. 6. FIG. 9 is a perspective view illustrating a state where the pipe holder is mounted to the measuring pipe support bracket of FIG. 5.

Figure 10:
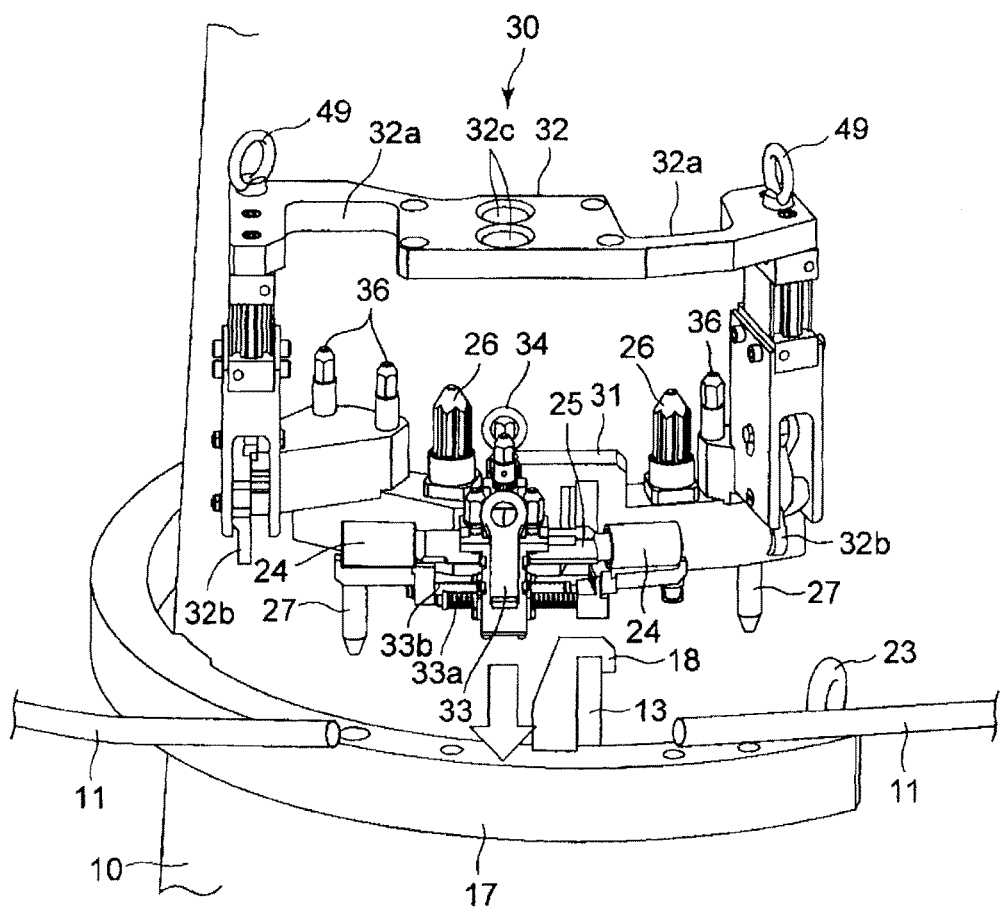
FIG. 10 is an exploded view illustrating a state before mounting of the measuring pipe connecting unit to the C-shaped clamp.
Figure 11:
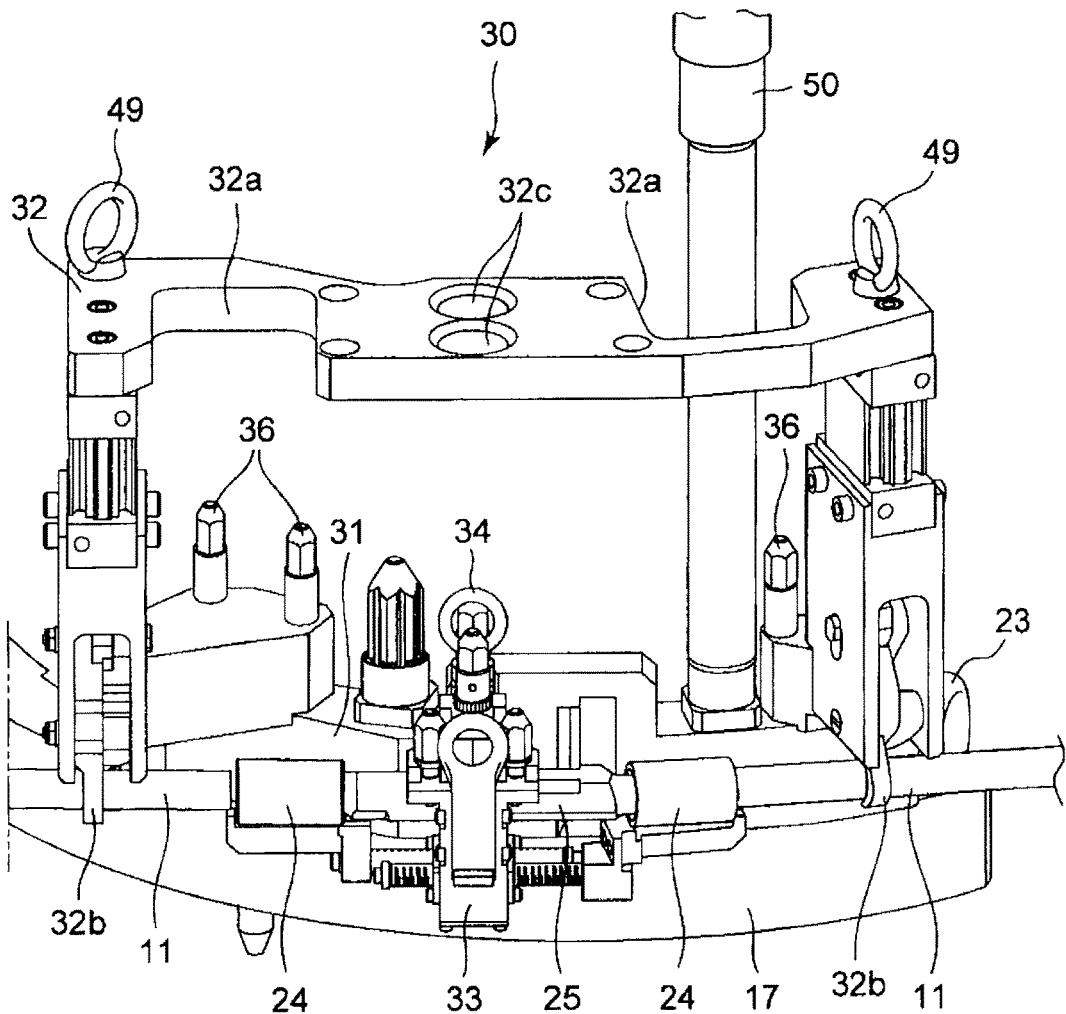
FIG. 11 is a perspective view illustrating a state where the measuring pipe connecting unit is mounted to the C-shaped clamp.
Figure 12:
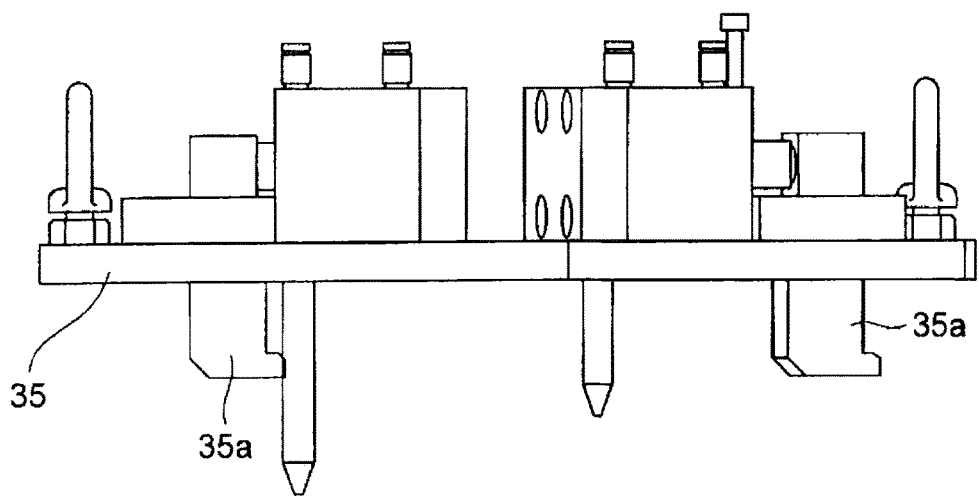
FIG. 12 is an elevation view illustrating a holder hanging member for hanging the pipe holder of FIG. 6.

FIG. 10 is an exploded view illustrating a state before mounting of the measuring pipe connecting unit to the C-shaped clamp. FIG. 11 is a perspective view illustrating a state where the measuring pipe connecting unit is mounted to the C-shaped clamp. FIG. 12 is an elevation view illustrating a holder hanging member for hanging the pipe holder of FIG. 6.

Hereinafter, a side facing the diffuser 10 in FIGS. 4 to 12 is referred to as a rear side, and a side opposite thereto is referred to as a front side.

Structures of constituent members constituting the measuring pipe connecting unit 30 used in step S2 will be described. As illustrated in FIG. 10, the measuring pipe connecting unit 30 roughly includes a measuring pipe support bracket 31, a connecting pipe feed mechanism 33, a connecting pipe feed wrench 34, and a pipe holder 32. The measuring pipe connecting unit 30 illustrated in FIGS. 9 to 11 is previously assembled in an air atmosphere such as an operation floor.

As illustrated in FIG. 11, the measuring pipe support bracket 31 serves a base for mounting the measuring pipe connecting unit 30 to the C-shaped clamp 17.

As illustrated in FIG. 4, the measuring pipe support bracket 31 has substantially a symmetrical shape in a longitudinal direction thereof. The measuring pipe support bracket 31 has, at a front side thereof, a pipe-repairing pipe (hereinafter, referred to as "spool piece") 25 whose both ends are fitted respectively into connecting pipes 24 each formed of a shape-memory alloy (SMA) having characteristics that original shape thereof is recovered when a temperature thereof reaches to a certain temperature.

The measuring pipe support bracket 31 has fixing bolts 26 at symmetrical positions in the longitudinal direction thereof. The fixing bolts 26 are fastened to the two fixing screw holes 21 formed in the C-shaped clamp 17 with a torque of 15 N·m to 20 N·m using a not illustrated wrench. As a result, the measuring pipe support bracket 31 is fixed to the C-shape clamp 17.

The measuring pipe support bracket 31 has positioning pins 27 at portions on a bottom surface thereof near both ends in the longitudinal direction. The positioning pins 27 are inserted respectively into the two positioning holes 22 formed in the C-shaped clamp 17. As a result, the measuring pipe support bracket 31 is positioned with respect to the C-shaped clamp 17.

The measuring pipe support bracket 31 has, at substantially a center thereof in the longitudinal direction, two mounting concave portions 31a for fitting and fixing the connecting pipe feed mechanism 33. The measuring pipe support bracket 31 has two insertion holes which are formed to the rear side of the mounting concave portions 31a so as to receive insertion of operating portions 45a and 45b of the connecting pipe feed wrench 34. The measuring pipe support bracket 31 further has, at each of both ends in the longitudinal direction, two screw holes 31b arranged side by side, into which mounting bolts 36 of the pipe holder 32 are screwed.

The following describes a process of assembling the measuring pipe connecting unit 30.

First, as illustrated in FIG. 5, the connecting pipe feed mechanism 33 is mounted to the measuring pipe support bracket 31. Specifically, shaft portions of two mounting bolts 37 of the connecting pipe feed mechanism 33 are inserted respectively into two mounting concave portions 31a of the measuring pipe support bracket 31, followed by fastening of the two mounting bolts 37. As a result, the connecting pipe feed mechanism 33 is fixed to the measuring pipe support bracket 31.

Then, the connecting pipe feed wrench 34 is mounted to the measuring pipe support bracket 31. Specifically, as illustrated in FIG. 5, the operating portions 45a and 45b of the connecting pipe feed wrench 34 are inserted into the two insertion holes 29. As a result, the connecting pipe feed wrench 34 is fitted to the measuring pipe support bracket 31.

Further, as illustrated in FIG. 6, the pipe holder is mounted to the measuring pipe support bracket 31. The pipe holder 32 is formed into a gate shape in a front view. The pipe holder 32 has hanging lugs 49 fixed at longitudinal direction both end portions on an upper surface thereof. Opening portions 32a opening toward the front and rear sides, respectively, are formed inside the hanging lugs 49. The pipe holder 32 has, at a longitudinal direction center on the upper surface, two operation holes 32c for receiving insertion of a tool such as a wrench.

As illustrated in FIGS. 7 and 8, the pipe holder 32 has, at lower ends of both leg portions, clamps 32b for holding the measuring pipe 11. Further, two mounting bolts 36 are installed near a lower portion of each of the both leg portions. The mounting bolts 36 are fastened using a wrench 50 as illustrated in FIG. 9 and are thereby screwed into the screw holes 31b formed in the measuring pipe support bracket 31. As a result, the pipe holder 32 is fixed to the measuring pipe support bracket 31.

The pipe holder 32 is hung by a holder hanging member 35 illustrated in FIG. 12 for mounting to the measuring pipe support bracket 31. Specifically, the holder hanging member 35 has two hooks 35a on a bottom surface thereof. The hooks 35a is hooked to an opening end of each of the opening portions 32a of the pipe holder 32. As a result, the pipe holder 32 is hung by the holder hanging member 35.

As described above, in the present embodiment, the connecting pipe feed mechanism 33, connecting pipe feed wrench 34, and pipe holder 32 are sequentially mounted to the measuring pipe support bracket 31 in this order, whereby assembly of the measuring pipe connecting unit 30 illustrated in FIGS. 9 to 11 is completed.

In step S2, the thus assembled measuring pipe connecting unit 30 is hung and held inside the reactor as illustrated in FIG. 10. At this time, the hooks 35a of the holder hanging member 35 is hooked to the opening end of each of the opening portions 32a of the pipe holder 32 and, thereby, the measuring pipe connecting unit 30 is hung.

Then, as illustrated in FIG. 11, the positioning pins 27 of the measuring pipe support bracket 31 are inserted respectively into the two positioning holes 22 formed in the C-shaped clamp 17. Further, the fixing bolts of the measuring pipe support bracket 31 are fastened/fixed to the two fixing screw holes 21 formed in the C-shaped clamp 17 with a torque of 15 N·m to 20 N·m using a not illustrated wrench.

After fixing the measuring pipe connecting unit 30 to the C-shaped clamp 17 in the manner described above, the holder hanging member 35 mounted to the pipe holder 32 are remote-controlled to be removed from the pipe holder 32. Through the above process, step S2 of mounting the measuring pipe connecting unit 30 is completed.

The following describes step S3 of connecting the measuring pipe 11.

In step S3, the connecting pipes 24 fitted over the both ends of the spool piece 25 of the measuring pipe support bracket 31 and ruptured parts of the measuring pipe 11 are connected to each other.

Specifically, the measuring pipe 11 on a #1 side (one end side) of a number of the diffusers 10 in its arrangement order and measuring pipe 11 on a #3 side (the other end side) are held by the cramps 32b of the pipe holder 32.

Then, a measuring pipe positioning device 43 is placed on an upper portion of the pipe holder 32 to assemble the measuring pipe positioning device 43 and pipe holder 32. Then, the measuring pipe positioning device 43 is used to operate the pipe holder 32 to align positions of center axis of both the measuring pipes 11 on the one side and the other side and center axis of the connecting pipes 24.

Thereafter, the connecting pipe feed wrench 34 is operated to insert the connecting pipes 24 over the measuring pipes 11.

Then, the measuring pipe positioning device 43 is separated from the upper portion of the pipe holder 32 for removal.

The operation of holding the measuring pipe 11 and operation of aligning the center axis of the measuring pipes 11 and connecting pipes 24 will be described more in detail.

Figure 13:
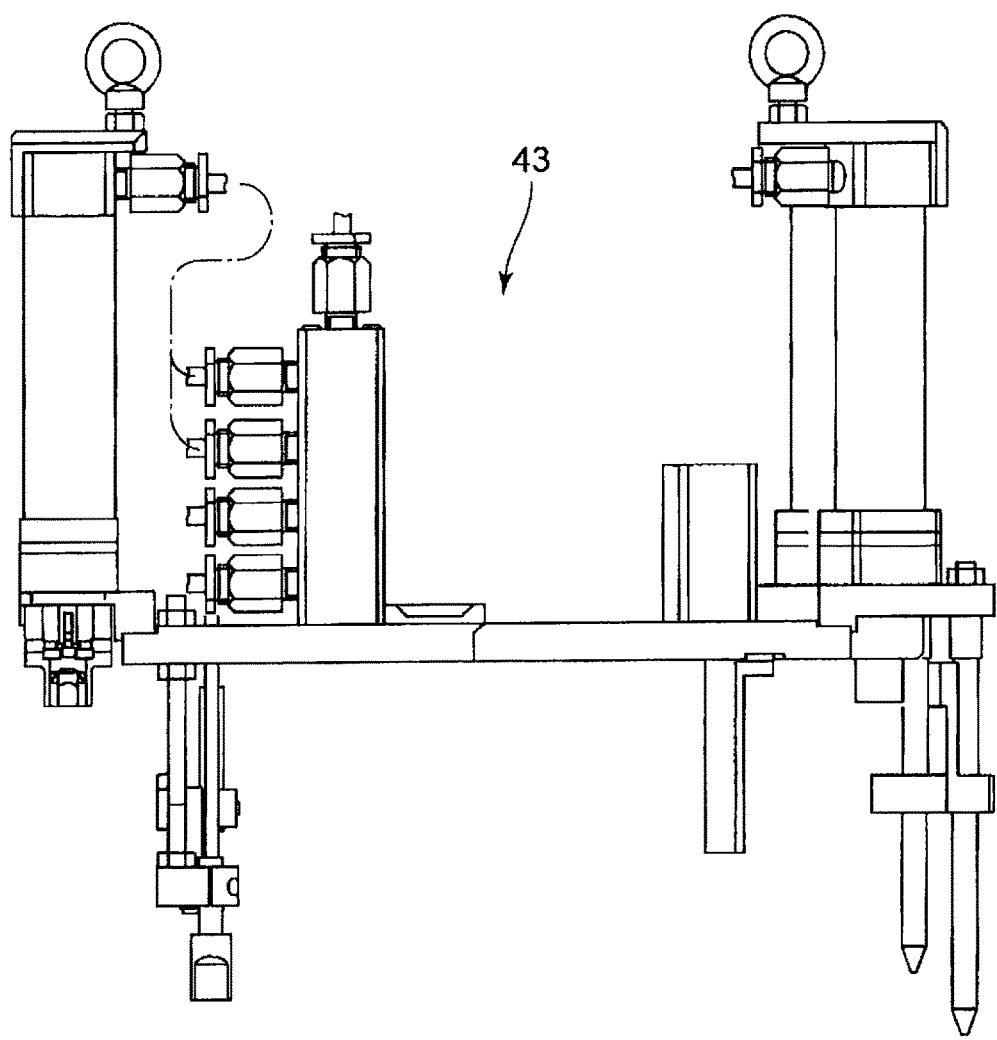
FIG. 13 is an elevation view illustrating a measuring pipe positioning device to be mounted to the pipe holder of FIG. 11.
Figure 14:
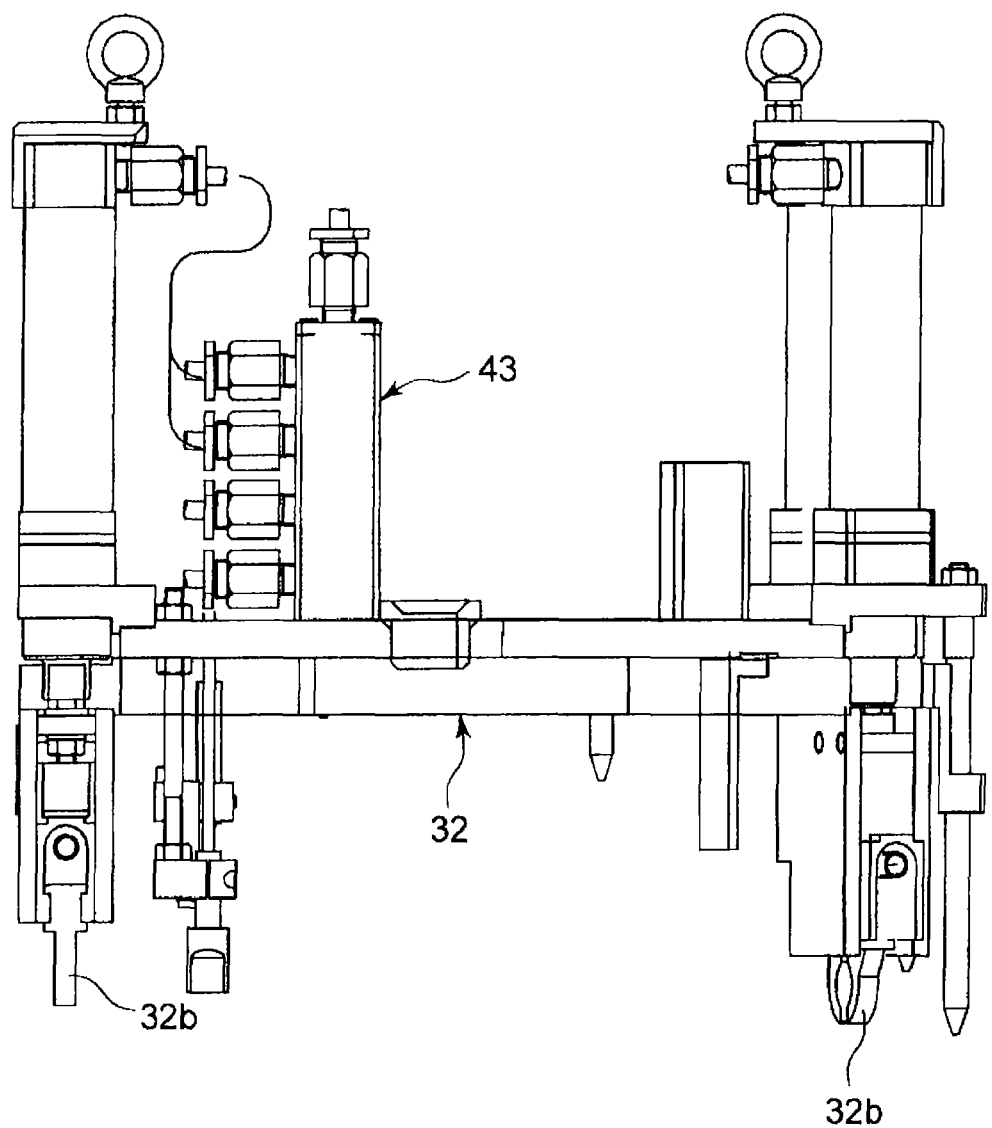
FIG. 14 is an elevation view illustrating a state where the measuring pipe positioning device is mounted to the pipe holder of FIG. 11.

FIG. 13 is an elevation view illustrating the measuring pipe positioning device to be mounted to the pipe holder of FIG. 11. FIG. 14 is an elevation view illustrating a state where the measuring pipe positioning device is mounted to the pipe holder of FIG. 11.

Although not illustrated, three stud bolts are installed at each of longitudinal direction both sides of an upper portion of the pipe holder 32, and one of the three stud bolts is remotely and manually operated using a wrench to make the clamp 32b hold the cut measuring pipe 11 as illustrated in FIG. 11.

Then, the holding state of the measuring pipe 11 is visually confirmed using an underwater TV camera. Thereafter, the measuring pipe positioning device 43 illustrated in FIG. 13 is lowered to be placed on the upper portion of the pipe holder 32 as illustrated in FIG. 14.

In the measuring pipe positioning device 43, not illustrated electrically-powered wrenches are incorporated at portions corresponding to the both measuring pipes 11. The electrically-powered wrenches are operated through a console installed in an air atmosphere to rotate the remaining two stud bolts installed to the pipe holder 32 to thereby move each of the both measuring pipes 11 in the vertical and horizontal directions.

The cut measuring pipe 11 is adjusted in position as described above to be located on an extension of the spool piece 25. That is, it is confirmed using an underwater TV camera that the measuring pipe 11 is located on the extension of the spool piece 25.

The following describes in detail the operation of inserting the connecting pipe 24 to the measuring pipe 11.

Figure 15:
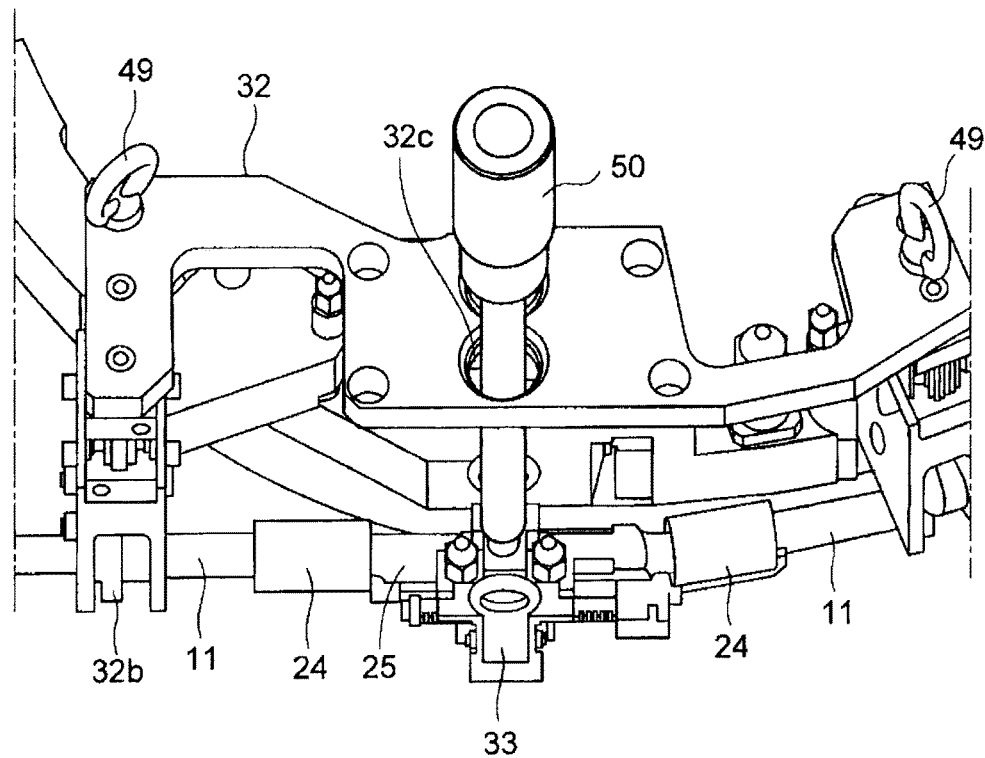
FIG. 15 is a perspective view illustrating a state where the measuring pipe positioning device of FIG. 14 is removed, and a wrench is inserted.
Figure 16:
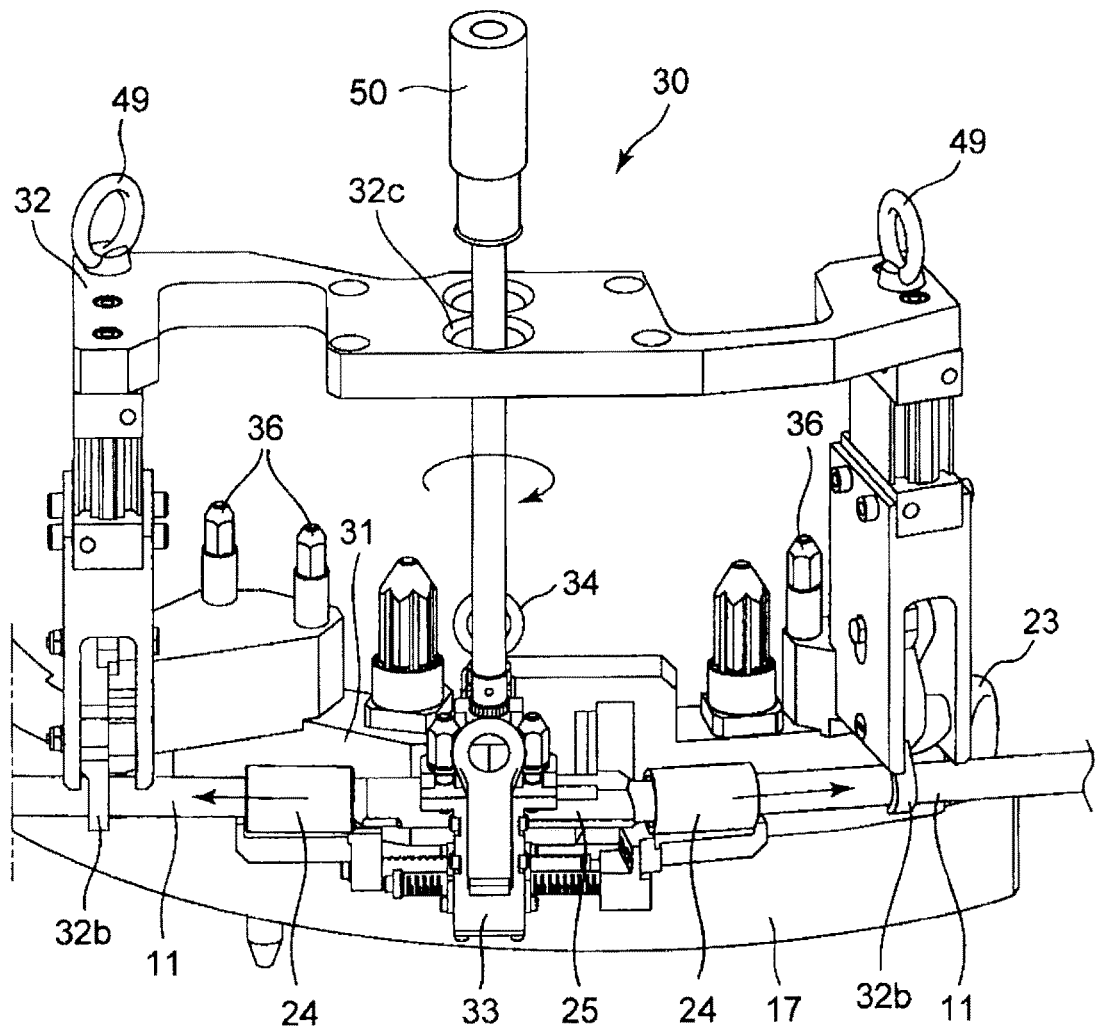
FIG. 16 is a perspective view illustrating a state where the feed wrench is operated to connect a connecting pipe to the measuring pipe in the state of FIG. 15.

FIG. 15 is a perspective view illustrating a state where the measuring pipe positioning device of FIG. 14 is removed, and a wrench is inserted. FIG. 16 is a perspective view illustrating a state where the feed wrench is operated to connect the connecting pipe to the measuring pipe in the state of FIG. 15.

The connecting pipe feed wrench 34 is used for operating a feed arm 38 so as to insert the connecting pipe 24 to the measuring pipe 11. Specifically, as illustrated in FIGS. 15 and 16, the wrench 50 is used to rotate operation bolts 44a and 44b of the connecting pipe feed wrench 34 of FIG. 5. The wrench 50 is passed through fitted onto the operation hole 32c formed in the pipe holder 32 to be fitted onto the operating bolt 44a or 44b. When the operating bolt 44a or 44b is rotated using the wrench 50, the operating portions 45a or 45b is correspondingly rotated.

A leading end of the operating portion 45a or 45b is connected to a rotary screw 33a or 33b provided in the connecting pipe feed mechanism 33 through a not illustrated connecting member such as a bevel gear. The rotary screws 33a and 33b are connected to the feed arms 38, respectively. Each of the feed arms 38 retains both ends of the connecting pipe 24 in an axial direction thereof. Thus, the operating bolt 44a or 44b is rotated using the wrench 50 to move the feed arm 38 in the axial direction through the rotary screw 33a or 33b. As a result, the connecting pipe 24 can be inserted over the measuring pipe 11.

Thereafter, the measuring pipe positioning device 43 is hoisted up from the pipe holder 32 for removal. Step S3 is thus completed.

The following describes step S4 of heating the connecting pipe 24.

Figure 17:
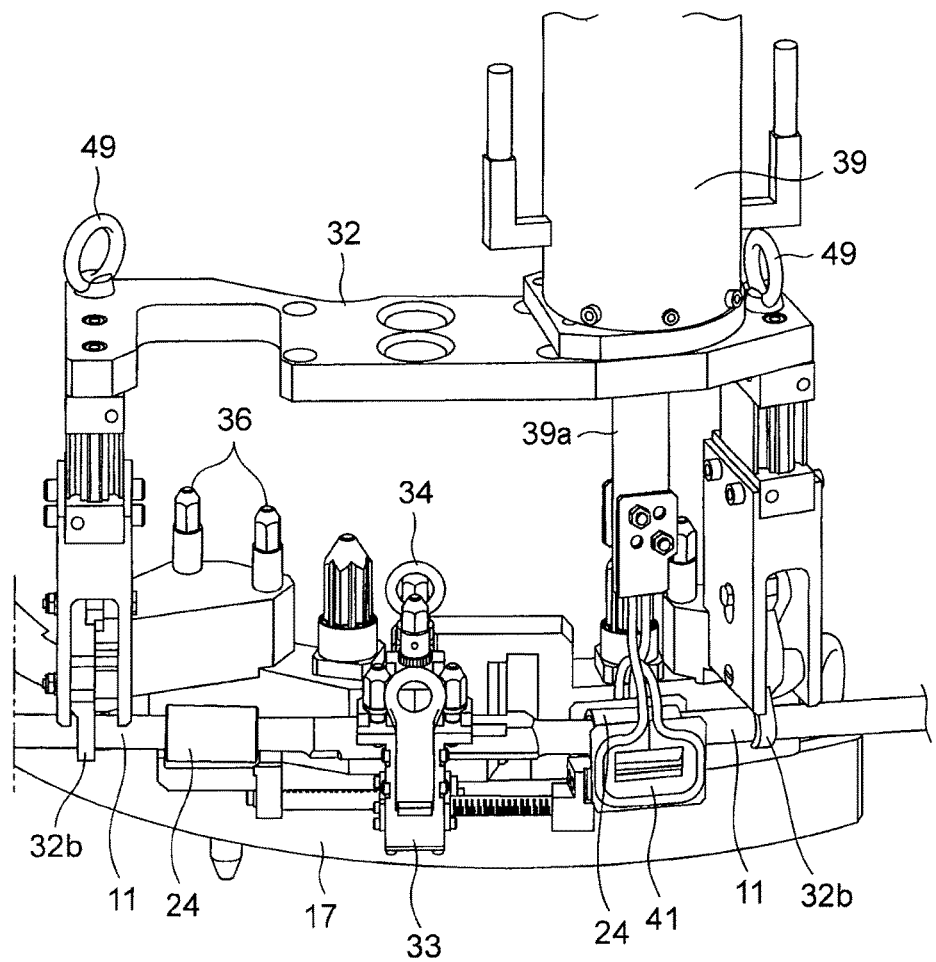
FIG. 17 is a perspective view illustrating a state where the connecting pipe is heated using a heater in the state of FIG. 16.
Figure 18:
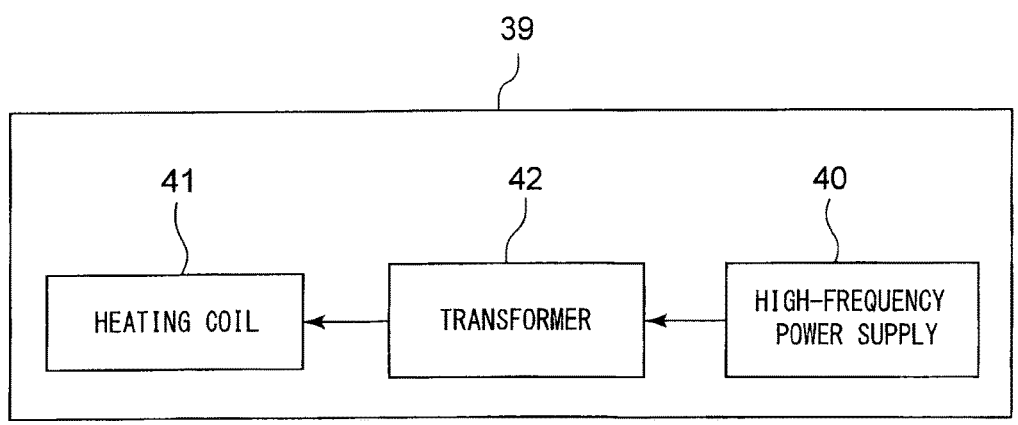
FIG. 18 is a block diagram illustrating an electrical system of the heater of FIG. 17.

FIG. 17 is a perspective view illustrating a state where the connecting pipe is heated using a heater in the state of FIG. 16. FIG. 18 is a block diagram illustrating an electrical system of the heater of FIG. 17.

As illustrated in FIG. 17, a heater 39 is fitted to the opening portion 32a of the pipe holder 32. A heating coil 41 is attached to the heater 39 through a connecting portion 39a. The heating coil 41 is disposed to sandwich the connecting pipe 24 in a state where the heater 39 is fitted to the opening portion 32a.

As illustrated in FIG. 18, the heater 39 has a high-frequency power supply 40 and a transformer 42, in addition to the heating coil 41. The high-frequency power supply 40 converts power into a direct current once to generate high-frequency energy of several 100 Hz to several MHz. The transformer 42 adjusts the high-frequency energy generated by the high-frequency power supply 40 to voltage and current required for the heating coil 41 as a load. The heating coil 41 is formed into a shape corresponding to a heated portion such as the connecting pipe 24.

The connecting pipe 24 formed of a shape-memory alloy surrounded by the heating coil 41 is heated by induction heating and is thus reduced in an inner diameter to connect the measuring pipe 11 thereto, whereby repair of the measuring pipe 11 is completed. Thereafter, the heater 39 is hoisted up by a not illustrated hanging member.

Typically, a steam boiler or a heater is used to heat the connecting pipe 24 so as to contract the connecting pipe 24 formed of a shape-memory alloy. In such a case, in order to increase an ambient temperature of the connecting tube 24 up to 100° C., it is necessary to surround the connecting pipe 24 by a chamber and to drain water from the chamber for heating. However, it is difficult to install and remove the chamber inside the reactor, so that skill and time are required for the repair work.

Since the connecting pipe 24 is heated by only the induction heating coil 41 in the present embodiment, it is not necessary to perform installation/removal work of the chamber, thereby allowing an improvement in workability and a significant reduction in work time.

The following describes step 5 of removing the pipe holder 32, connecting pipe feed wrench 34, and connecting pipe feed mechanism 33 from the measuring pipe connecting unit 30 for removal.

Figure 19:
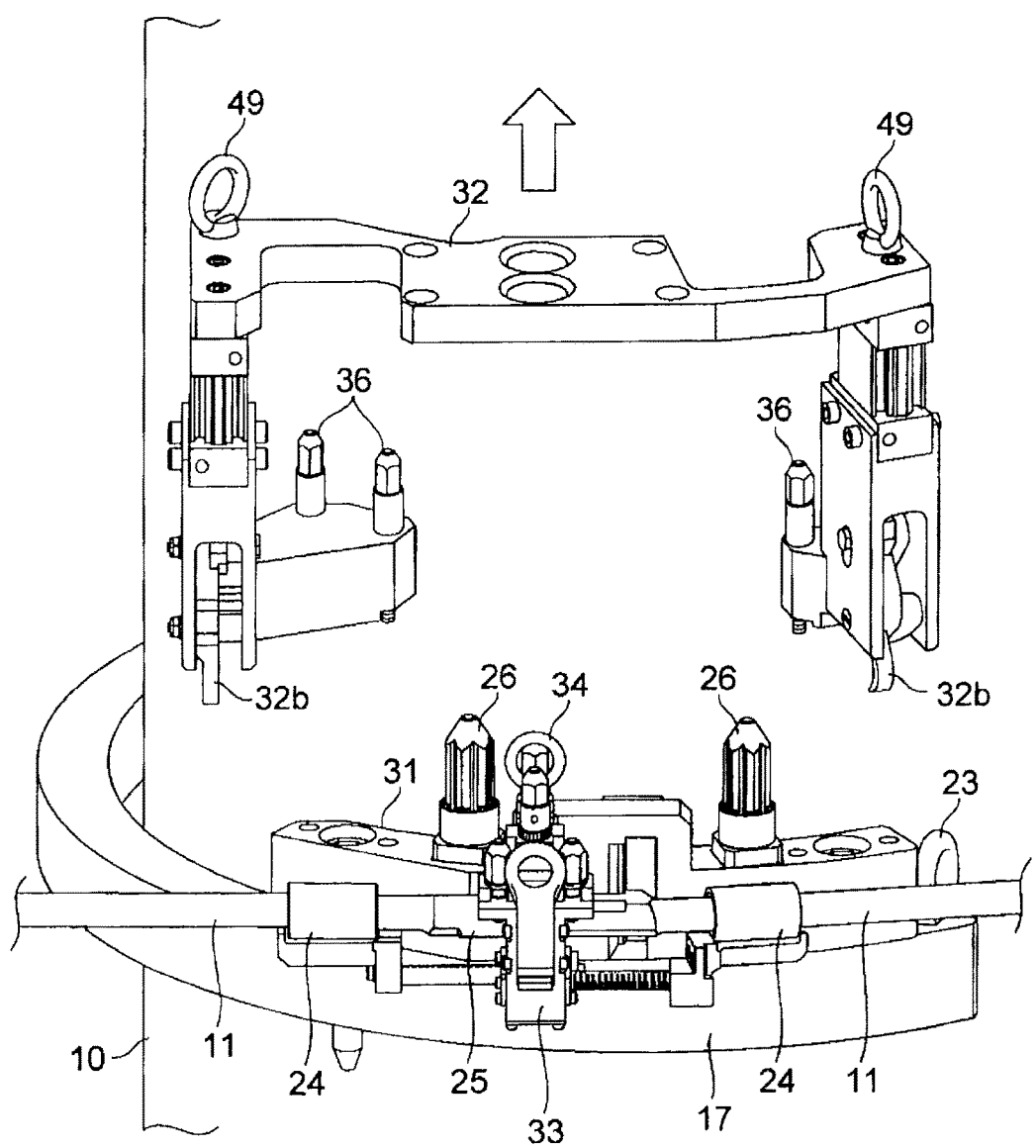
FIG. 19 is an exploded perspective view illustrating a state where the pipe holder in the state of FIG. 17 is removed.
Figure 20:
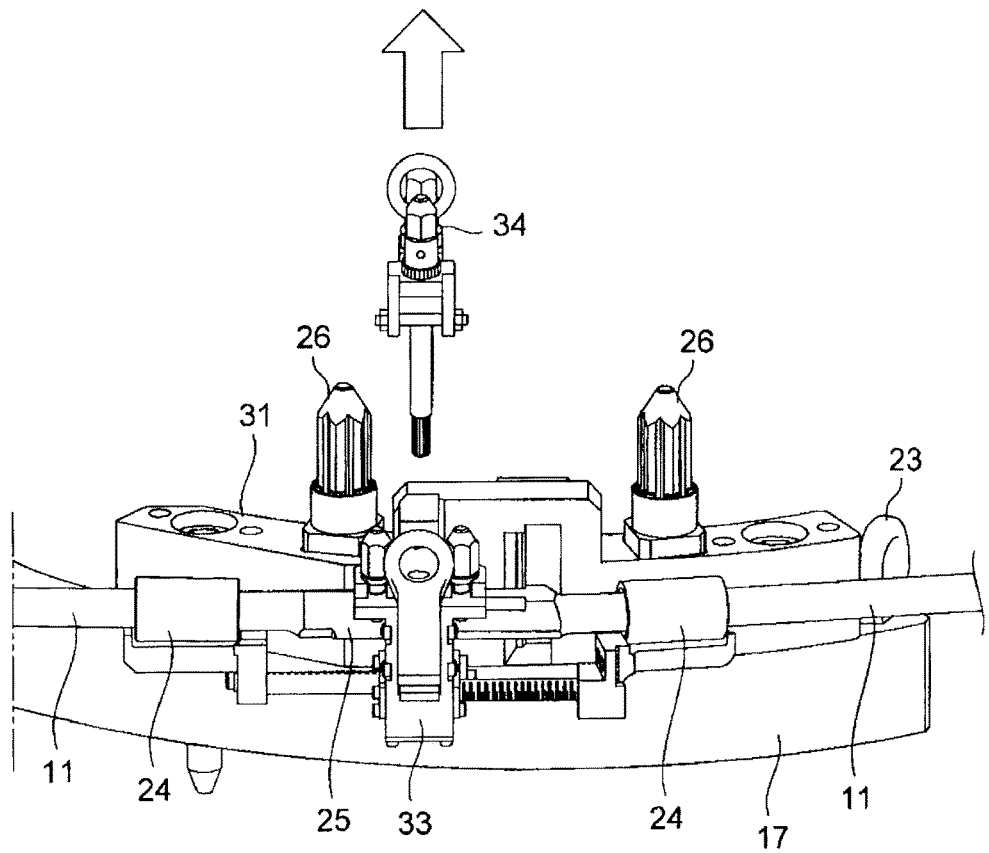
FIG. 20 is an exploded perspective view illustrating a state where the connecting pipe feed wrench in the state of FIG. 19 is removed.
Figure 21:
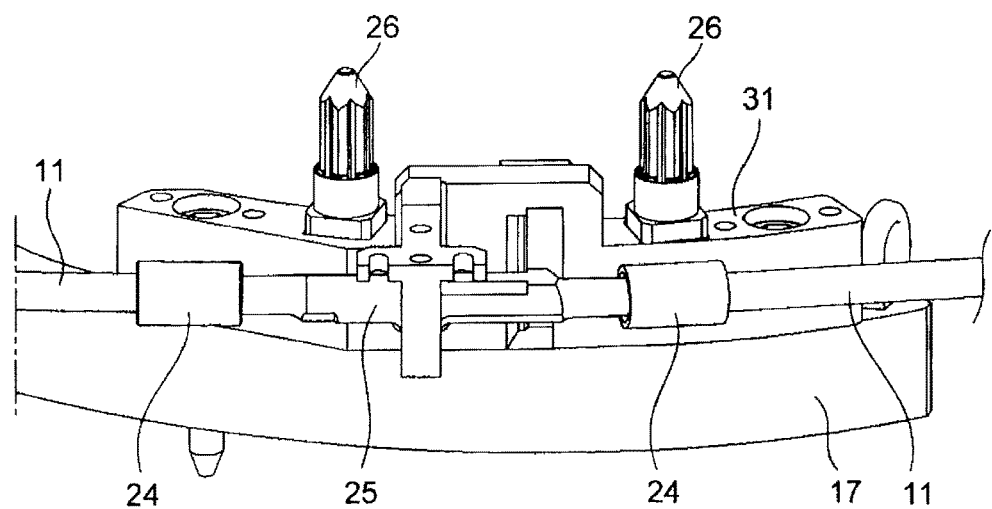
FIG. 21 is a perspective view illustrating a state where the connecting pipe feed wrench in the state of FIG. 19 has been removed.
Figure 22:
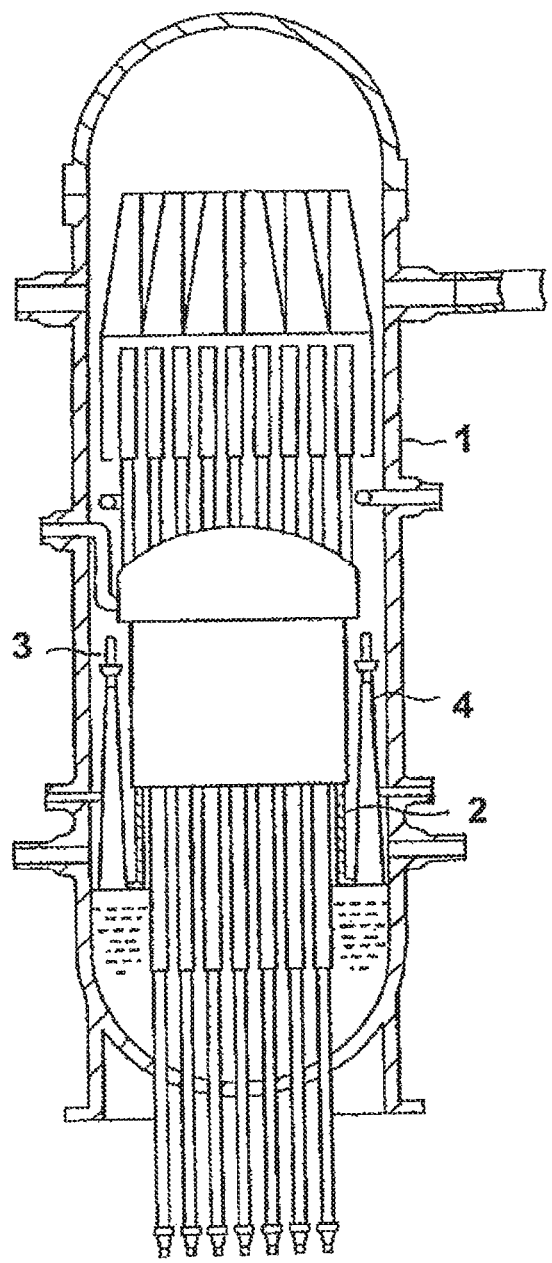
FIG. 22 is a sectional elevation view illustrating the schematic structure of a boiling water reactor.
Figure 23:
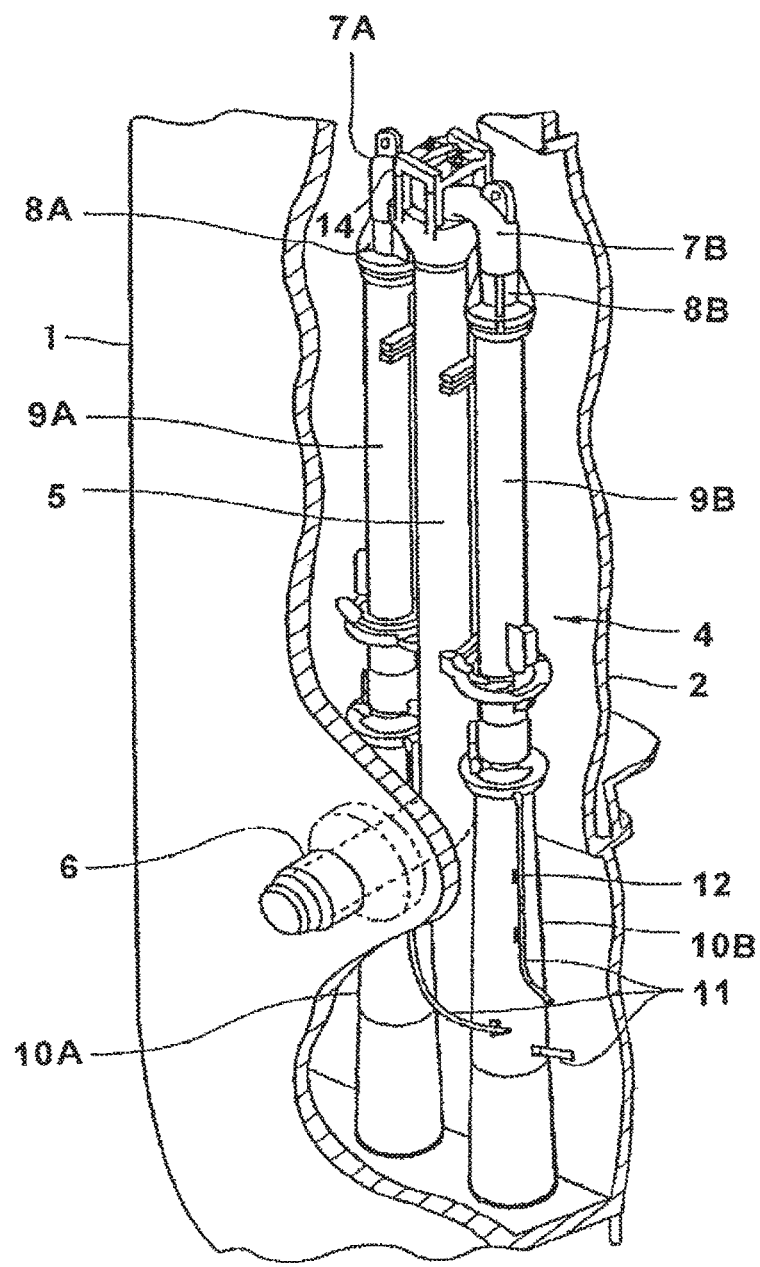
FIG. 23 is a perspective view illustrating an enlarged main part of a jet pump shown in FIG. 22.
Figure 24:
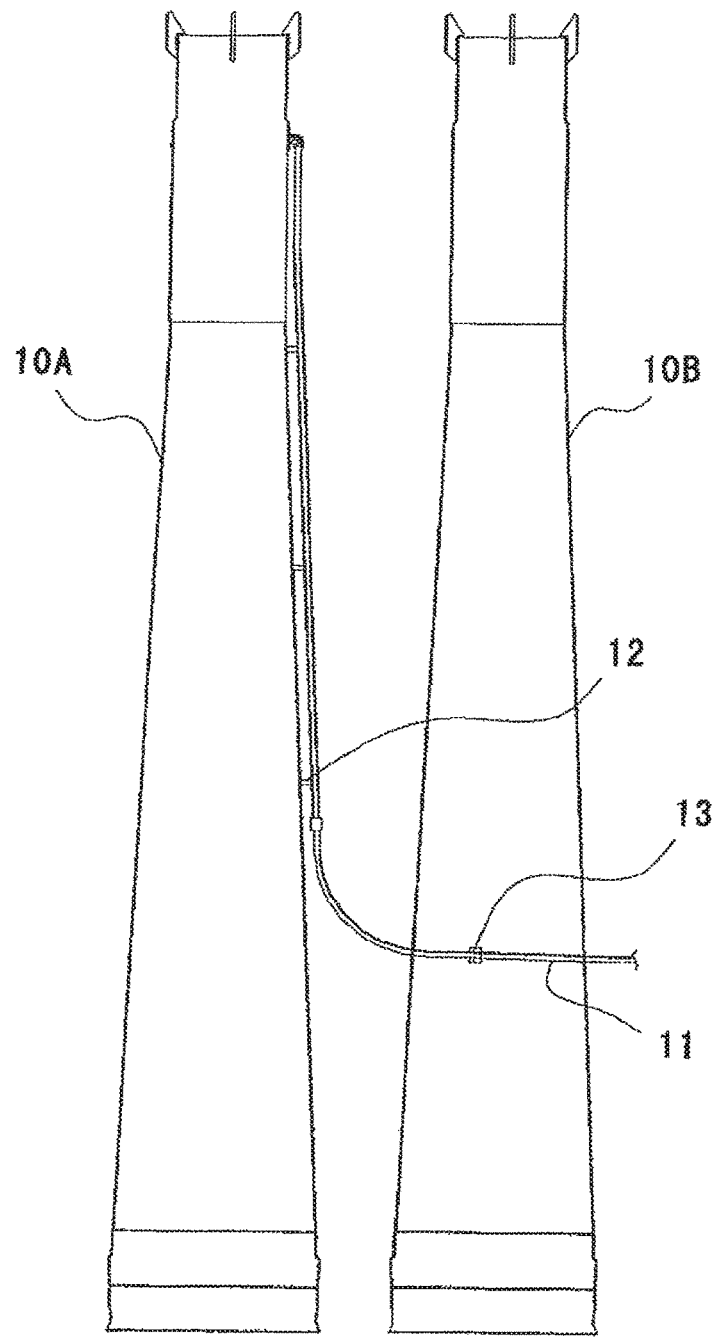
FIG. 24 is an elevation view illustrating an attached state of a conventional jet pump measurement pipe.
Figure 25:
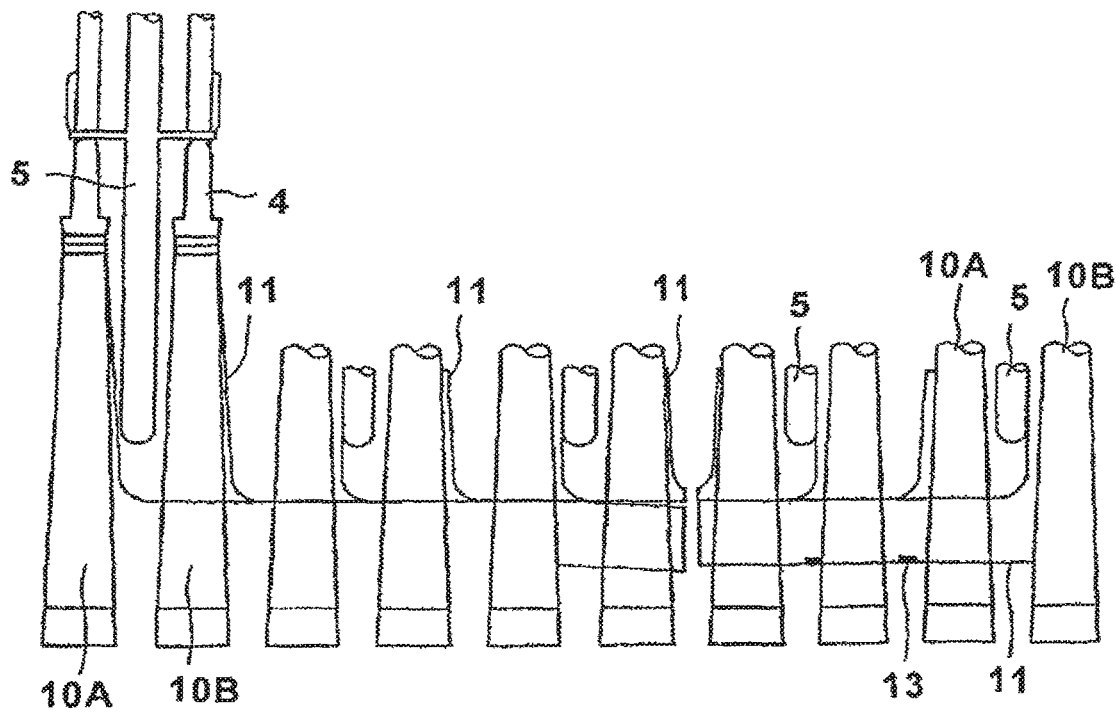
FIGS. 25A and 25B are configuration diagrams of a conventional jet pump measurement pipe.
Figure 25:
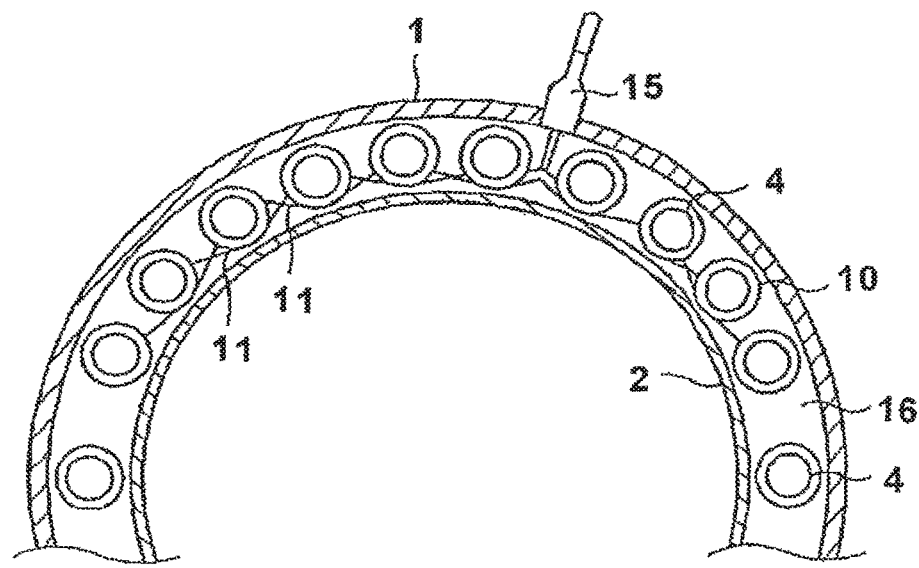

FIG. 19 is an exploded perspective view illustrating a state where the pipe holder in the state of FIG. 17 is removed. FIG. 20 is an exploded perspective view illustrating a state where the connecting pipe feed wrench in the state of FIG. 19 is removed. FIG. 21 is a perspective view illustrating a state where the connecting pipe feed wrench in the state of FIG. 19 has been removed.

As illustrated in FIG. 19, the holder hanging member is used to hoist up the pipe holder 32 from the measuring pipe connecting unit 30 for removal. Specifically, the mounting bolts 36 of the pipe holder 32 are loosened, and the pipe holder 32 is removed from the measuring pipe support bracket 31. Then, the holder hanging member 35 is used to hoist up the pipe holder 32 for removed.

Then, as illustrated in FIG. 20, the operating portions 45a and 45b of the connecting pipe feed wrench 34 are pulled out from the insertion holes 29 of the measuring pipe support bracket 31, and the hung connecting pipe feed wrench 34 is hoisted up for removal.

Further, a not illustrated wrench is used to loosen the mounting bolts 37 of the connecting pipe feed mechanism 33 to remove the connecting pipe feed mechanism 33 from the mounting concave portions 31a of the measuring pipe support bracket 31. Then, the connecting pipe feed mechanism 33 is hoisted up for removal.

As described above, after completion of the repair work of the measuring pipe 11, only a mechanism required for retaining the measuring pipe 11 is left remained, as illustrated in FIG. 21.

As described above, in the present embodiment, when the measuring pipe 11 horizontally installed to the lower portion of the jet pump 4 provided in reactor water inside the reactor pressure vessel 1 is ruptured, the C-shaped clamp 17 is fixed to the diffuser 10, and the measuring pipe connecting unit 30 provided with the spool piece 25 is mounted to the C-shaped clamp 17.

Thus, according to the present embodiment, the separately formed C-shaped clamp 17 and measuring pipe connecting unit 30 are sequentially mounted to the diffuser 10. This facilitates positioning work to contribute to a reduction in size of each member, facilitating the repair work even in a narrow space around a reactor bottom portion, which in turn can improve workability and product quality as compared to conventional approaches and can significantly reduce work time.

Further, according to the present embodiment, the center axis of the measuring pipe 11 and spool piece 25 are aligned with each other using the measuring pipe positioning device 43, facilitating connection of the measuring pipe 11 and spool piece 25, which in turn improve workability.

Further, according to the present embodiment, the connecting pipe 24 can be heated by only the induction heating coil 41, eliminating the need to perform installation/removal work of the chamber, thereby allowing an improvement in workability and a significant reduction in work time.

Further, according to the present invention, after completion of the repair work of the measuring pipe 11, the pipe holder 32, connecting pipe feed wrench 34, and connecting pipe feed mechanism 33 are removed from the measuring pipe connecting unit 30 for removal, so that only a mechanism required for retaining the measuring pipe 11 is left remained. This can reduce a possibility of loose parts due to missing members.

The embodiments of the present invention have been described above. Such embodiments have been presented by way of example and not intended to limit the scope of the invention. The new embodiments may be practiced in various other forms, and various omissions, substitutions, and modifications may be made without departing from the gist of the invention. Such embodiments and modifications are covered by the scope and gist of the invention, and embraced in the inventions set forth in the claims and the range of equivalency thereof.

For example, in the present embodiment, one end and the other end of the ruptured measuring pipe 11 are each directly connected to the connection pipe 24. Alternatively, however, the ruptured measuring pipe 11 may be previously cut at a certain accurate position by a cutter. Similarly, the support 13 may be previously cut at a certain accurate position by the cutter.

EXPLANATION OF THE SYMBOLS

1: reactor pressure vessel
2: shroud
3: downcomer portion
4: jet pump
5: riser pipe
6: recirculation inlet nozzle
7A, 7B: elbow
8A, 8B: mixing nozzle
9, 9A, 9B: inlet throat
10, 10A, 10B: diffuser
11: measuring pipe
12: block
13: support
14: transition piece
15: jet pump measuring nozzle
16: annular space
17: C-shaped clamp (support member)
17a: clamp body
17b protrusion
18: positioning hook
19: clamp fixing mechanism
19a: fixing bolt
19b: wedge block
20: slider
21: fixing screw hole
22: positioning hole
23: hanging lug
24: connecting pipe
25: spool piece (pipe-repairing pipe)
26: fixing bolt
27: positioning pin
28: fixing screw hole
29: insertion hole
30: measuring pipe connecting unit
31: measuring pipe support bracket
31a: concave portion
31b: screw hole
32: pipe holder
32a: opening portion
32b: clamp
32c: operation hole
33: connecting pipe teed mechanism
33a, 33b: rotary screw
34: connecting pipe feed wrench
35: holder hanging member
35a: hook
36: mounting bolt
37: mounting bolt
38: feed arm
39: heater
39a: connecting portion
40: high-frequency power supply
41: heating coil
42: transformer
43: measuring pipe positioning device
44a, 44b: operating bolt
45a, 45b: operating portion
49: hanging lug
50: wrench

The invention claimed is:

1. A jet pump measuring pipe repair method, comprising:
a diffuser of a jet pump provided in reactor water inside a reactor pressure vessel;
a ruptured measuring pipe, the measuring pipe being divided into two parts that are horizontally oriented with respect to the diffuser, and the support being cut into parts;
a support member fixing step of fixing a support member to a height direction and a peripheral direction to be adjusted in position, and to surround an outer periphery of the diffuser, the support member being hooked to a remaining part of the cut parts of the support by a positioning hook fixed to the support member, and to fix the diffuser and the measuring pipe by welding;
a connector mounting step of mounting, after the support member fixing step, a measuring pipe connector having a pipe-repairing pipe and connecting pipes fitted to both ends of the pipe-repairing pipe, to the support member;
a connecting step of connecting, after the connector mounting step, the two parts of the measuring pipe with the measuring pipe connector, by connecting the two parts of the measuring pipe and the connecting pipes,
wherein the connecting pipes are formed of a shape memory alloy, and the method further comprises, after the connecting step, a heating step of heating the connecting pipes by induction heating of a heater, the heater having a heating coil that sandwiches a heated portion of the connecting pipes.

2. The jet pump measuring pipe repair method according to claim 1, further comprising, after the heating step, a heater removing step of removing and hoisting up the heater.

3. A jet pump measuring pipe repair method that repairs a ruptured part of a measuring pipe horizontally installed to a diffuser of a jet pump provided in reactor water inside a reactor pressure vessel, the measuring pipe being divided into two parts, the method comprising:
a support member fixing step of fixing a support member to a height direction and a peripheral direction to be adjusted in position, and to surround an outer periphery of the diffuser, the support member being hooked to a remaining part of a previously cut support, with a positioning hook fixed to the support member, and to fix the diffuser and the measuring pipe by welding;
a connector mounting step of mounting, after the support member fixing step, a measuring pipe connector having a pipe-repairing pipe and connecting pipes fitted to both ends of the pipe-repairing pipe, to the support member; and a connecting step of connecting, after the connector mounting step, the two parts of the measuring pipe with the measuring pipe connector, by connecting the two parts of the measuring pipe and the connecting pipes, wherein the measuring pipe connector used in the connector mounting step includes a measuring pipe support bracket fixed to a predetermined position of the support member and provided with the pipe-repairing pipe, a pipe holder fixed to the measuring pipe support bracket and movable while holding the measuring pipe in vertical and horizontal directions, a connecting pipes connector for connecting the connecting pipes to the measuring pipe and for retaining both ends of the connecting pipes in an axial direction thereof, and a connecting pipe feed wrench for operating the connecting pipes connector to insert the connecting pipes over the measuring pipe, and the method further comprises, after the heating step, a plural devices removing step of removing and hoisting up the pipe holder, the connecting pipes connector, and the connecting pipe feed wrench except for the measuring pipe support bracket for retaining the measuring pipe.

4. The jet pump measuring pipe repair method according to claim 1, wherein in the connecting step, a measuring pipe positioning device is used to align a center axis of the measuring pipe and the pipe-repairing pipe and moves each of the measuring pipes in the vertical and horizontal directions.

* * * * *